(12) United States Patent
Takenoshita et al.

(10) Patent No.: US 7,856,766 B2
(45) Date of Patent: Dec. 28, 2010

(54) SEISMIC ISOLATION DEVICE

(75) Inventors: Yukinori Takenoshita, Fujisawa (JP); Yukihiro Hosono, Fujisawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 12/306,713

(22) PCT Filed: Jun. 27, 2007

(86) PCT No.: PCT/JP2007/062883

§ 371 (c)(1), (2), (4) Date: Jul. 9, 2009

(87) PCT Pub. No.: WO2008/004475

PCT Pub. Date: Jan. 10, 2008

(65) Prior Publication Data

US 2009/0313917 A1 Dec. 24, 2009

(30) Foreign Application Priority Data

Jul. 6, 2006 (JP) ............................. 2006-187114

(51) Int. Cl.
*E04B 1/98* (2006.01)
*E04H 9/02* (2006.01)

(52) U.S. Cl. .................... 52/167.8; 52/167.4; 52/167.7; 52/167.1; 248/636

(58) Field of Classification Search .............. 52/167.1, 52/167.4, 167.7, 167.9, 167.8; 248/560, 248/569, 570, 636, 638, 634
See application file for complete search history.

(56) References Cited

U.S. PATENT DOCUMENTS 4,593,502 A * 6/1986 Buckle ...................... 52/167.7
5,201,155 A * 4/1993 Shimoda et al. ............ 52/167.7
5,452,548 A * 9/1995 Kwon ........................ 52/167.8
5,761,856 A * 6/1998 Kishizono et al. .......... 52/167.8
5,765,322 A * 6/1998 Kubo et al. ................. 52/167.7

(Continued)

FOREIGN PATENT DOCUMENTS

JP 4111877 4/1992

(Continued)

*Primary Examiner*—Jeanette E. Chapman
(74) *Attorney, Agent, or Firm*—Stetina Brunda Garred & Brucker

(57) ABSTRACT

To provide a seismic isolation device, even if a relative height between friction plates, which are laminated in a hollow part of a laminated rubber body, and the laminated rubber body changes at a deformation of the laminated rubber body, which prevents allophone, vibration and shock from inside of the seismic isolation device (laminated rubber body), resulting superiority in durability, safety, and amenity. The seismic isolation device comprising: a laminated rubber body 2 in which elastic material layers 2b and rigid material layers 2c are vertically laminated one after the other; a plurality of friction plates 3 vertically laminated so as to be horizontally slidable and wholly enclosed in a hollow part 2a vertically penetrating the laminated rubber body; pressurizing means 4A, 4B arranged at a topmost portion and/or at a lowermost portion of the laminated friction plates and vertically adding pressure; and a friction reducing means 5 arranged between each outer peripheral portion of the plurality of the friction plates and an inner peripheral surface of the hollow part of the laminated rubber body. Even if a relative height of the friction plates and the inner peripheral surface of the hollow part of the laminated rubber changes, the friction reducing means smoothens the slide between them.

20 Claims, 3 Drawing Sheets

U.S. PATENT DOCUMENTS 6,385,918 B1 * 5/2002 Robinson .................. 52/167.8

FOREIGN PATENT DOCUMENTS

| JP | 2001517286 | | 10/2001 |
|---|---|---|---|
| JP | 2002139100 | | 5/2002 |
| JP | 2002139100 A | * | 5/2002 |
| JP | 2003278828 | | 10/2003 |
| JP | 2006038180 | | 2/2006 |
| JP | 200697878 | | 4/2006 |

* cited by examiner

[FIG. 1]
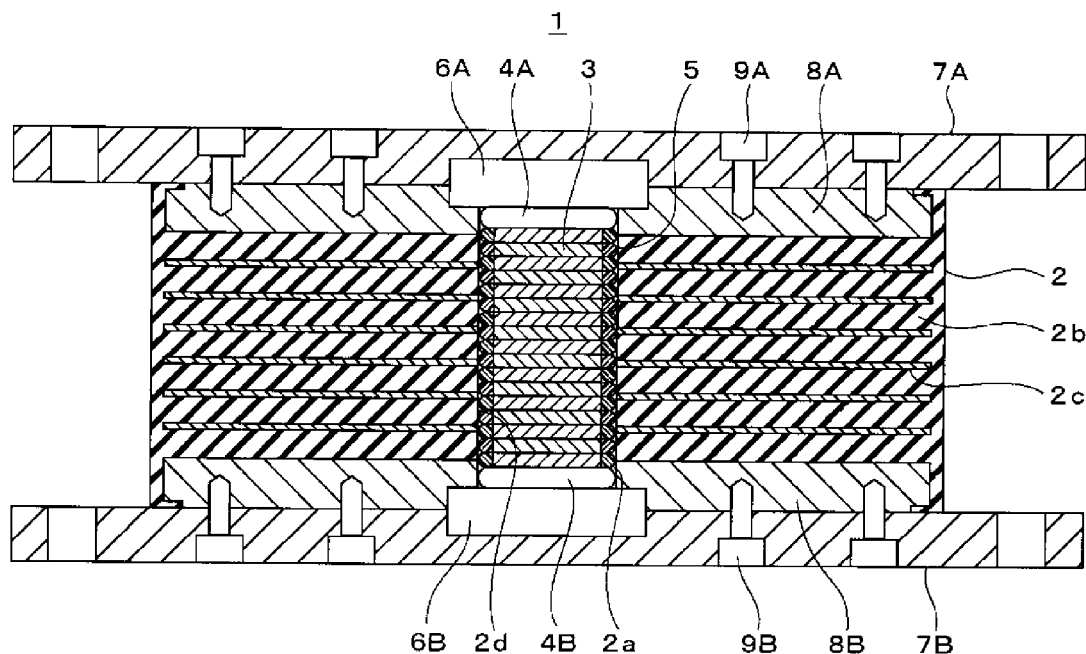
[FIG. 2]
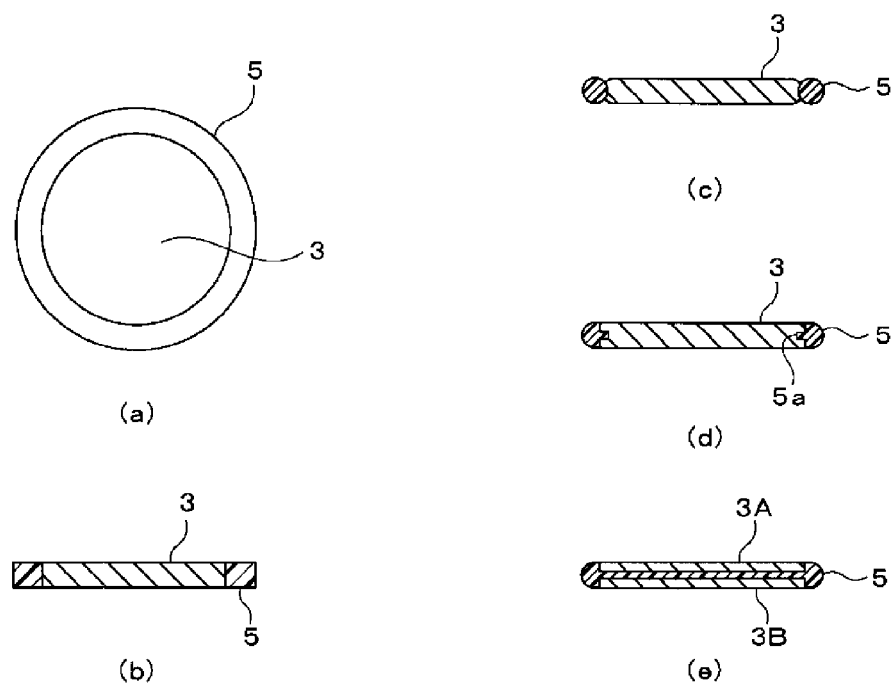

[FIG. 3]
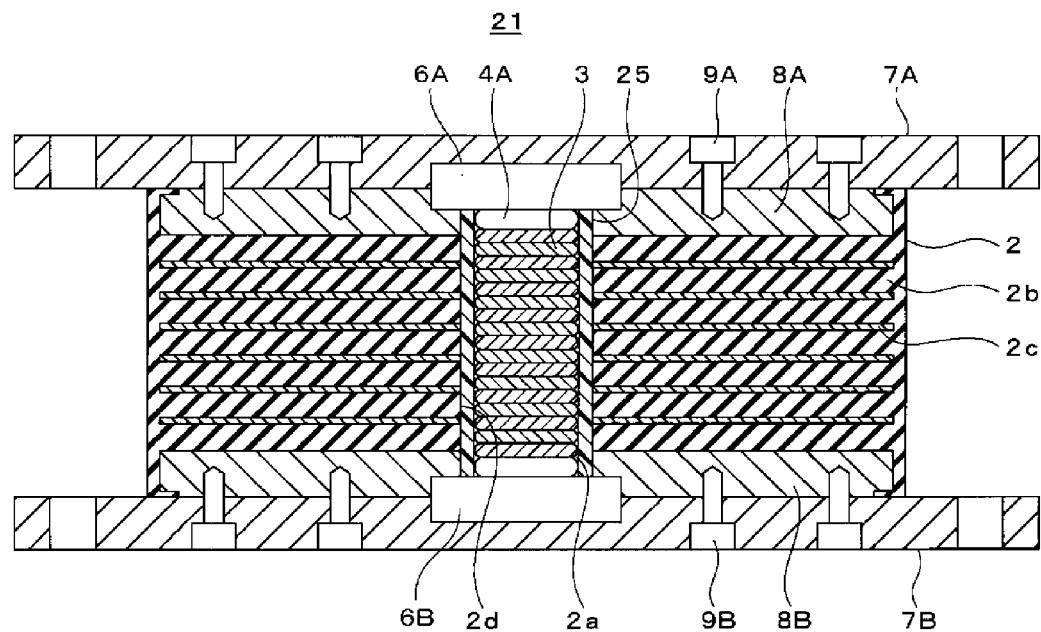
[FIG. 4]
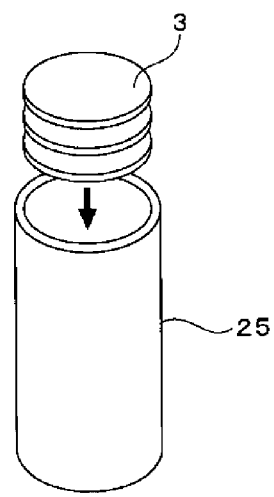

[FIG. 5]
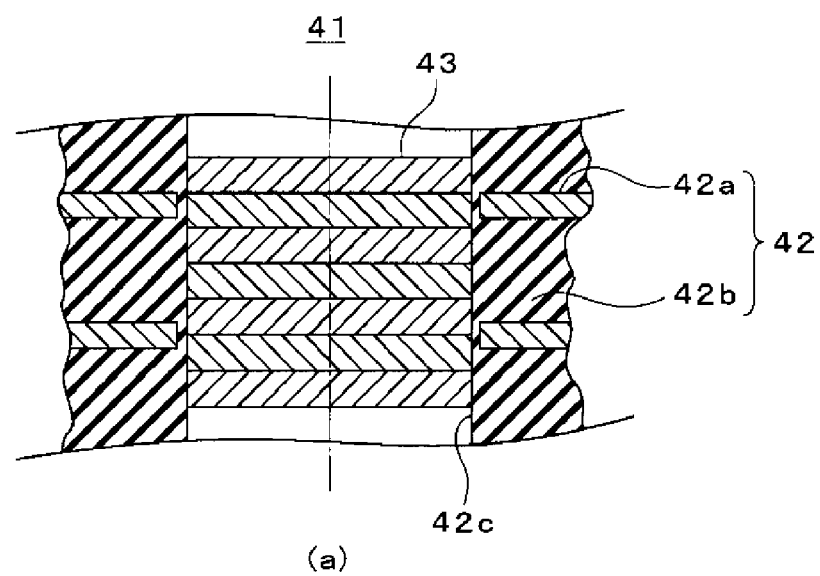
(a)
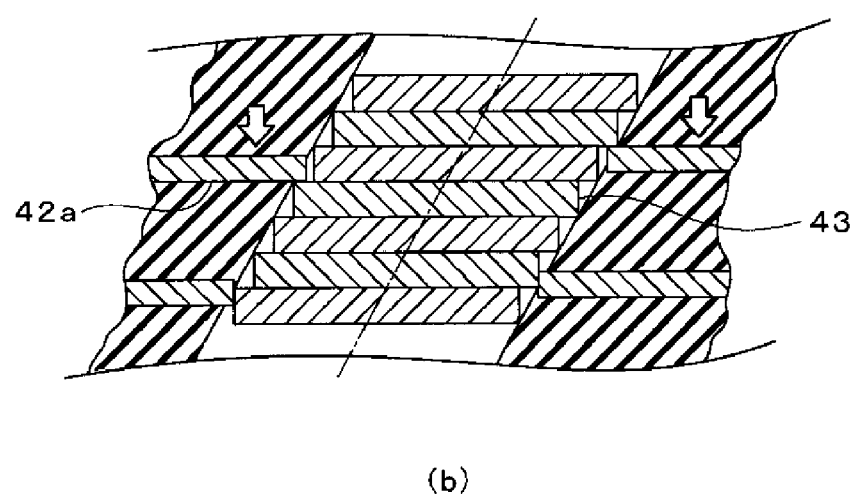
(b)

SEISMIC ISOLATION DEVICE

CROSS-REFERENCE TO RELATED APPLICATIONS

The present application claims priority to International Application No. PCT/JP2007/062883 which was filed on Jun. 27, 2007 and claims priority to Japanese Patent Application No. 2006-187114 filed on Jul. 6, 2006.

STATEMENT RE: FEDERALLY SPONSORED RESEARCH/DEVELOPMENT

Not Applicable

BACKGROUND OF THE INVENTION

1. Technical Field of the Invention

The present invention relates to a seismic isolation device, and more particularly to a seismic isolation device mounted between an upper structure of a bridge constructed by engineering work and a building, etc, and a substruction or a lower structure thereof, to suppress shake of the upper structure against an earthquake.

2. Description of the Related Art

Conventionally, various sorts of seismic isolation devices have been proposed. The devices are provided with friction plates arranged so as to be laminated in a hollow part vertically formed through a laminated rubber body, and supports vertical load of an upper structure, and provides attenuation by frictional force between the friction plates when horizontal deformation arises by an earthquake or the like.

For example, the patent document 1 describes a seismic isolation structure comprising a complex laminated body, and a laminated body that are held in parallel between an upper surface plate and a lower surface plate. In the complex laminated body, hard plates with rigidity and elasticity plates with viscoelasticity are laminated one after the other, and in the laminated body, and friction plates such as metallic plates coated with a plurality of high molecular compounds are laminated.

In addition, a seismic isolation structure is described in the patent document 2. In the seismic isolation structure, twenty copper plates as hard plates and twenty one rubber plates as soft plates are alternately laminated between an upper surface plate and a lower surface plate, and forty three friction plates made of unsaturated polyester resin reinforced by glass fiber are laminated, and those are enclosed in a hollow part provided in the central portion of the laminate body part. In the seismic isolation structure, an iron plate is arranged as a presser plate on the laminated body of the frictional plates; an upper cover to which a female thread is screwed is disposed at the central portion thereof; the upper cover is fastened with a torque of 150 kg-cm to apply charging force to the friction-plates-laminated body; and the charging force is adjustable through torque to the upper cover.

Further, the patent document 3 proposes a base isolation support device that comprise: a flexible support body in which elastomer layers such as rubber and middle rigidity plates are vertically laminated and adhered one after the other; a slide plates lamination body in which a plurality of slide plates consisting of at least one of iron alloy, copper or its alloy, polytetrafluoroethylene, and graphite are vertically laminated so as to be slidable with each other. The slide plates lamination body is arranged so as to be enclosed by the flexible support body, and the two bodies cooperatively support load, and some of the slide plates of the slide plates lamination body are made of material of which friction coefficient differs from that of other slide plates.

Since these devices according to the above inventions have a constant height of the laminated friction plates, they are preferred for lightweight structures such as single houses for instance, against secular changes arising in the laminated rubber body, as a means for inhibiting a creep phenomenon that vertical displacement gradually decreases, or a means for suppressing a vertical subduction phenomenon at the time of horizontal deformation of the laminated rubber body. On the other hand, in case that the load supported by the seismic isolation device is large, excessive vertical load acts on the friction plates or friction plate mounting parts, which may cause a change in their friction characteristic, breakage of the friction plates, and also breakage of the seismic isolation device itself.

Then, focusing to the action of the vertical subduction at the horizontal deformation of the laminated rubber body, a technology for preventing excessive vertical load from acting on the friction plates is proposed. In this technology, shock absorbing material is mounted above and/or below the friction plates laminated in the hollow part of the laminated rubber body.

For example, the patent document 4 proposes a seismic isolation device that comprises: a laminated rubber body in which rubber plates and metal plates are adhered one after the other, and a throughhole is prepared in a direction vertical to surfaces of the laminated plates; flanges adhered to the both end faces of the laminated rubber body: a plurality of friction plates laminated in the throughhole of the laminated rubber body; and an elastic member to which precompression for vertically pressing the friction plates is applied.

In addition, a seismic isolation device for light weight construction is proposed in the patent document 5. In the seismic isolation device, between a pair of mounting plates are laminated reinforcing plates and elasticity plates one after the other; these mounting plates and elasticity plates, and these elasticity plates and reinforcing plates are respectively adhered with each other to form a seismic isolation device main body; through the main body is drilled a hole for attenuating vibration penetrating at least the reinforcing plates and the elasticity plates; in the hole are disposed low resiliency members with low strength and rigid plate-like bodies are laminated one after the other; a clearance is formed between an outer peripheral portion of each low resiliency member and a face constituting the hole; and the plate-like bodies are slidable with each other.

Further, the patent document 6 proposes a seismic isolation device, which comprises: a laminated part in which rubber-like elasticity layers and rigid plate layers are alternately laminated in a vertical direction; a throughhole vertically passing through the laminated part; and a plurality of friction plates enclosed in the throughhole with a state that the plates are laminated, and the device is characterized in that seizure of the friction plates between them and changes in friction coefficient accompanied by the seizure can be suppressed, and stable seismic isolation effect may be obtained.

Patent document 1: Japanese Patent Publication Heisei 8-105123 gazette

Patent document 2: Japanese Patent Publication Heisei 9-296845 gazette

Patent document 3: Japan Patent 3717287 gazette

Patent document 4: Japanese Patent Publication Showa 62-141330 gazette

Patent document 5: Japan Patent 2990532 gazette

Patent document 6: Japanese Patent Publication 2000-283229 gazette

BRIEF SUMMARY OF THE INVENTION

In the seismic isolation devices described in the patent documents 4 to 6 and the like, at the topmost part and/or at the lowermost part of the friction plates are mounted shock absorbing materials, for instance, the elastic members in the patent document 4, the low elasticity members in the patent document 5, the elastic bodies (leaf springs) in the patent document 6 to prevent excessive vertical power caused by vertical subduction when the laminated rubber body is subject to horizontal deformation from being added to the friction plates by vertical deformation of the shock absorbing materials. However, regarding the height of the laminated friction plates, since the friction plate themselves are rigid, the height thereof does not change even if horizontal deformation occurs.

On the other hand, the laminated rubber body enclosing the friction plates generates, as mentioned above, the vertical subduction at its horizontal deformation, for example, in the laminated rubber body 42 constituted of the rigid material layers 42a and the elastic material layers 42b of the seismic isolation device 41 shown in FIG. 5(a), at the horizontal deformation of the laminated rubber body 42, end faces of friction plates 43 and an inner peripheral surface 42c of the hollow part of the laminated rubber body 42 horizontally deforms while vertically rubbing with each other.

In that case, when friction at the contact area between the friction plates 43 and the inner peripheral surface 42c of the hollow part of the laminated rubber body 42 is large, the both cannot smoothly vertically move with each other, sometimes, as shown in FIG. 5(b), it will be in a state that the rigid material layers 42a used for the laminated rubber body 42 and the friction plates 43 are caught with each other, so that a loud fricative arises from the inside of the laminated rubber body 42 with horizontal deformation, or vibration and a shock arise from the inside of the laminated rubber body 42, resulting in a threat of problem on its seismic isolation performance.

Further, there may be threats of deformation and breakage of the friction plates 43 or the rigid material layers 42a, and troubles in durability and safety of the seismic isolation device 41 themselves, an allophone may occur from the seismic isolation device at the time of a minor earthquake that occurs relatively frequently, which may also cause a threat that the allophone gives a user or an administrator of the seismic isolation structure excessive jitters.

Especially, the above phenomenon may notably appear in case that the thickness of one layer of the elastic material layers 42b used for the laminated rubber body 42 is large since the amount of the subduction by horizontal deformation of the laminated rubber body 42 becomes large, concretely, in designing a large scale seismic isolation device for bridges, the thickness of one layer of the elastic material layers 42b is often enlarged in relation to rotation absorptance of a beam, in other words, it may have a problem especially at a huge bridge or the like using a large scale seismic isolation device.

The present invention has been made in consideration of the above problems in the conventional seismic isolation devices and the like, and the object thereof is to provide a seismic isolation device characterized in that at a horizontal deformation of a laminated rubber body, even if a relative height between the friction plates, which are laminated in a hollow part of the laminated rubber body, and the laminated rubber body changes, the friction plates and the inner peripheral surface of the hollow part of the laminated rubber body can smoothly slide with each other, and as a result, even if the seismic isolation device (laminated rubber body) horizontally deforms due to an earthquake or the like, allophone, vibration and shock from inside of the seismic isolation device (laminated rubber body) can be prevented, resulting superiority in durability, safety, and amenity as well.

To achieve the above object, the present invention relates to a seismic isolation device, and this device comprising: a laminated rubber body in which elastic material layers and rigid material layers are vertically laminated one after the other; a plurality of friction plates vertically laminated so as to be horizontally slidable and wholly enclosed in a hollow part vertically penetrating the laminated rubber body; a pressurizing means arranged at a topmost portion and/or at a lowermost portion of the laminated friction plates and vertically adding pressure and absorbing a vertical displacement; and a friction reducing means arranged between each outer peripheral portion of the plurality of the friction plates and an inner peripheral surface of the hollow part of the laminated rubber body.

With the present invention, even when the laminated rubber body horizontally deforms due to earthquake or the like and relative height between the friction plates and the inner peripheral surface of the hollow part of the laminated rubber body changes, by the friction reducing means, friction between the friction plates and the inner peripheral surface of the hollow part of the laminated rubber body can be smoothened, in addition, since the pressurizing means is disposed at the topmost portion and/or at the lowermost portion of the friction plates, load to the friction plates can be reduced, which prevents generation of unusual sound and breakage of the friction plates. As a result, it becomes possible to improve durability of the seismic isolation device as well as safety of the device and amenity of houses and like.

In the seismic isolation device, the friction plates can be made of one selected from a group consisting of a metal, a resin, a resin compound, a fiber-reinforced resin, a sintered compact, and a composite made of two or more selected from them.

In the seismic isolation device, the pressurizing means may include one selected from a group consisting of a rubber-like elastic body, a disc spring, a leaf spring, and a coil spring. With this pressurizing means, it becomes possible to vertically apply pressure and absorb vertical displacement.

In the seismic isolation device, the friction reducing means may include one of a slide portion baked on an outer peripheral end face of each friction plate and a slide portion integrally formed with the outer peripheral end face. Further, as the material for the slide portion, a resin with lubricity, a resin compound with lubricity, or a self-lubricity rubber can be used. Specifically, polytetrafluoroethylene resin, polytetrafluoroethylene resin containing a filler, acetal resin, polyurethane resin, phenol resin, polyamide resin, polyester system resin, or self-lubricity rubber can be used. It is also possible to apply grease to the outer peripheral end face of each friction plate to form the slide portion.

Moreover, in the seismic isolation device, the friction reducing means may include a cylindrical slide part arranged between the inner peripheral surface of the hollow part of the laminated rubber body and the laminated friction plates, and as the material for the cylindrical slide part, a resin with lubricity and flexibility, a resin compound with lubricity and flexibility, or a self-lubricity rubber can be used. Specifically, a film, a sheet or a tube made of polyethylene resin, polytetrafluoroethylene resin or self-lubricity rubber can be used. With this, it becomes possible to reduce friction between the end faces of the friction plates arranged in the cylindrical part and the inner peripheral surface of the hollow part of the laminated rubber body, and prevent trouble caused by vertical rubbing between the friction plates and the inner peripheral surface of the hollow part of the laminated rubber body that is generated at the horizontal deformation of the laminated rubber body.

In the seismic isolation device, a friction coefficient of the slide portion or that of the cylindrical slide part of the friction reducing means to the elastic material layer or the rigid material layer can be smaller than a friction coefficient of the friction plate to the elastic material layer or the rigid material layer.

In the seismic isolation device, each of the friction plates laminated in the cylindrical slide part may be provided with one of a slide portion baked on the outer peripheral end face thereof and a slide portion integrally formed with said outer peripheral end face, which allows the slide movement between the friction plate and the elastic material layer or the rigid material layer to further be smoothened.

In the seismic isolation device, one of an outer edge portion of the friction plate and an outer edge portion of the slide portion of the friction reducing means may be formed to be outwardly protruding curved face. Specifically, the edge portion may be formed to be radius or chamfer. With this, the slide movement between the friction plate and the elastic material layer or the rigid material layer can further be smoothened. In addition, an outer edge portion of each friction plate laminated in a cylindrical portion of the cylindrical slide portion or an outer edge portion of the slide portion as the friction reducing means mounted to the friction plate may be formed to be outwardly protruding curved face.

As described above, with the present invention, in a seismic isolation device that is provided with friction plates arranged so as to be laminated in a hollow part vertically formed through a laminated rubber body, while supporting vertical load of an upper structure, provides attenuation by frictional force between the friction plates when horizontal deformation arises by an earthquake or the like, at the horizontal deformation of the laminated rubber body, even if a relative height between the friction plates, which are laminated in the hollow part of the laminated rubber body, and the laminated rubber body changes, the friction plates and an inner peripheral surface of the hollow part of the laminated rubber body can smoothly slide with each other, even if the seismic isolation device horizontally deforms at an earthquake or the like, allophone, vibration and shock from inside of the seismic isolation device can be prevented, resulting in superiority in durability, safety, and amenity.

BRIEF DESCRIPTION OF THE DRAWINGS

FIG. 1 is a cross-sectional view showing an overall construction of a seismic isolation device according to a first embodiment of the present invention;

FIG. 2 is a collection of views showing a ring-shaped friction reducing means mounted to an outer peripheral surface of the friction plate of the seismic isolation device shown in FIG. 1;

FIG. 3 is a cross-sectional view showing an overall construction of a seismic isolation device according to a second embodiment of the present invention;

FIG. 4 is a perspective view showing the relation between the cylindrical friction reducing means and the friction plates of the seismic isolation device shown in FIG. 3; and FIG. 5 is a collection of views depicting the motion of a conventional seismic isolation device when an earthquake occurs.

DETAILED DESCRIPTION OF THE INVENTION

Next, embodiments of the present invention will be explained in detail with reference to figures.

FIG. 1 shows a seismic isolation device according to the first embodiment of the present invention, and the seismic isolation device 1 roughly comprises: a laminated rubber body 2 in which elastic material layers 2b and rigid material layers 2c are laminated; a plurality of friction plates 3 vertically laminated so as to be horizontally slidable and wholly enclosed in a hollow part 2a vertically penetrating the laminated rubber body 2; a pressurizing means 4 arranged at a topmost portion and at a lowermost portion of the laminated friction plates 3 and vertically adding pressure and absorbing a vertical displacement; and a friction reducing means 5 arranged between each outer peripheral portion of the plurality of the friction plates 3 and an inner peripheral surface of the laminated rubber body 2.

The laminated rubber body 2 is provided to stably support a structure or the like, and attenuate horizontal vibration due to earthquake, etc. and make shake of the structure long-periodizable, and is constructed such that the elastic material layers 2b made of rubber and the rigid material layers 2c made of steel plate are vertically laminated one after the other, and is cylindrical on the whole. At the central portion of the laminated rubber body 2 is drilled the hollow part 2a, as described above, in the hollow part 2a are laminated the plurality of friction plates 3.

The friction plates 3 are mounted to attenuate horizontal vibration generated by earthquake or the like by means of frictional force generated between vertically adjacent friction plates 3, and are laminated in plural in the hollow part 2a of the laminated rubber body 2. This friction plate 3 is preferably formed by a material that can obtain stable as well as large frictional force such as a metal, a resin, a resin compound, a fiber-reinforced resin, and a sintered compact. Further, a composite made of two or more selected from these materials, for example, a multi-layer friction plate consisting of a thin metal plate, a sintered compact layer, and a resin compound layer, or a composite in which these plate members are alternately laminated can be used. In addition to those, various friction plates for brakes may be used.

The pressurizing means 4A, 4B are respectively mounted between the topmost portion of the friction plates 3 and an upper shearing key 6A and between the friction plates 3 and a lower shearing key 6B to absorb a vertical displacement of the laminated rubber body 2 and apply pressure to the friction plates 3. These pressurizing means 4 (4A, 4B) are sufficiently usable to absorb vertical displacement while transmitting force so as not to act excessive load on the friction plates 3, rubber-like elastic bodies, disc springs, leaf springs, and coil springs may be used. Meanwhile, in the construction of this embodiment, although the pressurizing means 4 are disposed at the both portions of the topmost and lowermost of the friction plates 3, it is possible to dispose the pressurizing means 4 to either the topmost or the lowermost portion of the friction plates 3.

The friction reducing means 5 is, as shown in FIGS. 2(a), (b), mounted so as to integrally adhered to the outer peripheral portion of each friction plate 3 to shape like a ring with a rectangular cross section to smoothen slide between the outer peripheral portion of the friction plate 3 and the inner peripheral surface 2d of the hollow part 2a of the laminated rubber body 2 shown in FIG. 1 and attenuate friction between them.

This friction reducing means 5 may be a resin with lubricity, a resin compound with lubricity, and a self-lubricity rubber. Other than the shapes shown in FIGS. 2(a), (b), as illustrated in FIG. 2(c), a ring shape with a circular cross section may be adopted, and as shown in FIG. 2(d), it may be constructed so as to have a projecting portion 5a at a portion where contacting the friction plate 3 to make the boding with the friction plate 3 much stronger. In addition, as shown in FIG. 2(e), it may be constructed such that a disk-shaped friction reducing means 5 with a thick outer peripheral portion is held between vertically arranged two friction plates 3 (3A, 3B). Moreover, without integrally adhering or attaching to the outer peripheral end face of each friction plate 3, the friction reducing means 5 can be baked on the outer peripheral end face of the friction plate 3. And, grease may be applied to the outer peripheral end face of each friction plate 3 to form the slide portion of the friction reducing means.

The upper flange plate 7A and the lower flange plate 7B shown in FIG. 1 are respectively joined to an upper connection steel plate 8A and a lower connection steel plate 8B of the laminated rubber body 2 accommodating the friction plates 3 and the pressurizing means 4 in the hollow part 2a thereof though the upper shearing key 6A, the lower shearing key 6B and attachment bolts 9A, 9B. The upper flange plate 7A is, for instance, connected to a superstructural work of a bridge and others, and the lower flange plate 7B is connected to substructural work thereof and so on.

Next, the motion of the seismic isolation device 1 with the above-mentioned construction will be explained with reference to drawings.

In FIG. 1, in a usual state, the laminated rubber body 2 supports a structure or the like that is integral with the upper flange plate 7A in a stable state. When external force due to an earthquake or the like is added to the seismic isolation device 1, the laminated rubber body 2 attenuates horizontal vibration to long-periodize the shake of the structure or the like. On the other hand, frictional force generated between vertically adjacent friction plates 3 reduces horizontal vibration. With this, energy due to earthquake or the like that is applied to the structure, etc. is absorbed and damage and destruction of the structure, etc. are prevented.

At that moment, when horizontally deforming laminated rubber body 2 vertically sinks, which causes change in relative height between the inner peripheral surface 2d in the hollow part 2a of the laminated rubber body 2 and the friction plates 3 to make the inner peripheral surface 2d of the hollow part 2a and end portions of the friction plates 3 slide with each other, in this case, the friction reducing means 5 reduces friction generated between the inner peripheral surface 2d of the hollow part 2a and the friction plates 3, so that unnecessary catchings between the two, stress concentration due to strong friction and trouble in deformation followablity of the friction plates 3 can be prevented.

Further, although the vertical subduction at the horizontal deformation of the laminated rubber body 2 almost add an excessive load to the friction plates 3, the pressurizing means 4 adhered to the topmost and lower most portions of the friction plates 3 prevent the excessive vertical load from applying the friction plates 3.

As described above, with the seismic isolation device 1 of the present invention, unusual sound and breakage of the friction plates, which may be generated in conventional seismic isolation devices can be prevented, as a result, durability of the seismic isolation device as well as safety of the seismic isolation device and amenity of houses and like may be improved.

Next, a seismic isolation device according to the second embodiment of the present invention will be explained with reference to drawings.

As illustrated in FIG. 3, the seismic isolation device 21 roughly comprises: the laminated rubber body 2 in which the elastic material layers 2b and the rigid material layers 2c are vertically laminated one after the other; the plurality of friction plates 3 vertically laminated so as to be horizontally slidable and wholly enclosed in the hollow part 2a vertically penetrating the laminated rubber body 2; the pressurizing means 4 arranged at the topmost portion and at the lowermost portion of the laminated friction plates 3 and vertically adding pressure and absorbing a vertical displacement; and a cylindrical friction reducing means 25 arranged between the inner peripheral surface 2d of the hollow part 2a of the laminated rubber body 2 and the friction plates 3.

A characterized portion of the seismic isolation device 21 is the friction reducing means 25, which is disposed in place of the friction reducing means 5 of the seismic isolation device 1 according to the first embodiment. Meanwhile, compositions other than the friction reducing means 25 are the same as those of the seismic isolation device 1 shown in FIG. 1, so that the same reference numbers are added to the same compositions and detailed explanation thereof will be omitted.

The friction reducing means 25 is mounted to reduce friction between each end face of the friction plates 3 laminated in the hollow part 2a of the laminated rubber body 2 and the inner peripheral surface 2d of the hollow part 2a of the laminated rubber body 2 and to prevent trouble caused by vertical rubbings between the ends of the friction plates 3 and the inner peripheral surface 2d of the hollow part 2a at a horizontal deformation of the laminated rubber body 2, and as shown in FIG. 4, the friction reducing means 25 is constructed to be cylindrical, and a lot of friction plates 3 are laminated therein.

For this friction reducing means 25 is used a material with lubricity and flexibility, for example, a film, a sheet or a tube made of polyethylene resin, polytetrafluoroethylene resin or self-lubricity rubber. And, in this embodiment also, outer peripheral portions of friction plates 3 are preferably be formed to be radius or chamfer to allow the slide between the friction plates 3 and the friction reducing means 25 to be smoothened.

Next, the motion of the seismic isolation device 21 with the above-mentioned construction will be explained with reference to FIG. 3.

In a usual state, the laminated rubber body 2 supports a structure or the like that is integral to the upper flange plate 7A in a stable state. When external force due to an earthquake or the like is added to the seismic isolation device 21, the laminated rubber body 2 attenuates horizontal vibration to long-periodize the shake of the structure or the like. On the other hand, frictional force generated between vertically adjacent friction plates 3 reduces horizontal vibration. With this, energy due to earthquake or the like that is applied to the structure, etc. is absorbed and damage and destruction of the structure, etc. are prevented.

At that moment, when horizontally deforming laminated rubber body 2 vertically sinks, which causes change in relative height between the inner peripheral surface 2d of the hollow part 2a of the laminated rubber body 2 and the friction plates 3, however, there is the cylindrical friction reducing means 25 between the two, so that the inner peripheral surface 2d of the hollow part 2a of the laminated rubber body 2 and the friction plates 3 do not contact directly with each other, but the friction reducing means 25 and the inner peripheral surface 2d of the hollow part 2a of the laminated rubber body 2 slide with each other as well as the friction reducing means 25 and the friction plates 3 slide with each other. As a result, unnecessary catchings between the inner peripheral surface 2d of the hollow part 2a and the friction plates 3, stress concentration due to strong friction and trouble in deformation followablity of the friction plates 3 can be prevented.

Further, although the vertical subduction at the horizontal deformation of the laminated rubber body 2 almost add an excessive load to the friction plates 3, the pressurizing means 4 adhered to the topmost and lower most portions of the friction plates 3 prevent the excessive vertical load from applying the friction plates 3.

As described above, with the seismic isolation device 21 of the present invention also, unusual sound and breakage of the friction plates, which may be generated in conventional seismic isolation devices can be prevented, as a result, durability of the seismic isolation device as well as safety of the seismic isolation device and amenity of houses and like may be improved.

Meanwhile, although in the above embodiments is explained the present invention with seismic isolation devices 1, 21, as examples, which are used for bridges constructed by engineering work or the like in which thickness per one layer of the elastic material layer 2b of the laminated rubber body 2 is relatively thick, the present invention is also applicable to a seismic isolation device used for structures in which thickness per one layer of the elastic material layer 2b of the laminated rubber body 2 is relatively thin in the same manner as described above.

EXPLANATION OF SIGNALS 1 seismic isolation device
2 laminated rubber body
2a hollow part
2b elastic material layer
2c rigid material layer
2d inner peripheral surface
3(3A, 3B) friction plate
4(4A, 4B) pressurizing means
5 friction reducing means
5a projecting portion
6A upper shearing key
6B lower shearing key
7A upper flange plate
7B lower flange plate
8A upper connection steel plate
8B lower connection steel plate
9A attachment bolt
9B attachment bolt
21 seismic isolation device
25 friction reducing means

The invention claimed is:

1. A seismic isolation device comprising:
a laminated rubber body in which elastic material layers and rigid material layers are vertically laminated one after the other;
a plurality of friction plates vertically laminated so as to be horizontally slidable and wholly enclosed in a hollow part vertically penetrating said laminated rubber body;
a pressurizing means arranged at a topmost portion and/or at a lowermost portion of said laminated friction plates and vertically adding pressure and absorbing a vertical displacement; and
a friction reducing means arranged between each outer peripheral portion of said plurality of the friction plates and an inner peripheral surface of said hollow part of the laminated rubber body.

2. The seismic isolation device as claimed in claim 1, wherein said friction plates are made of one selected from a group consisting of a metal, a resin, a resin compound, a fiber-reinforced resin, a sintered compact, and a composite made of two or more selected from them.

3. The seismic isolation device as claimed in claim 1, wherein said pressurizing means includes one selected from a group consisting of a rubber-like elastic body, a disc spring, a leaf spring, and a coil spring.

4. The seismic isolation device as claimed in claim 1, wherein said friction reducing means includes one of a slide portion baked on an outer peripheral end face of each friction plate and a slide portion integrally formed with said outer peripheral end face.

5. The seismic isolation device as claimed in claim 1, wherein said friction reducing means includes a cylindrical slide part arranged between the inner peripheral surface of the hollow part of the laminated rubber body and the laminated friction plates.

6. The seismic isolation device as claimed in claim 4, wherein a friction coefficient of the slide portion of the friction reducing means to the elastic material layer or the rigid material layer is smaller than a friction coefficient of the friction plate to the elastic material layer or the rigid material layer.

7. The seismic isolation device as claimed in claim 4, wherein said slide portion mounted to the outer peripheral end face of each friction plate is one of a resin with lubricity, a resin compound with lubricity, and a self-lubricity rubber.

8. The seismic isolation device as claimed in claim 5, wherein said cylindrical slide part is one of a resin with lubricity and flexibility, a resin compound with lubricity and flexibility, and a self-lubricity rubber.

9. The seismic isolation device as claimed in claim 5, wherein each of the friction plates laminated in the cylindrical slide part is provided with one of a slide portion baked on the outer peripheral end face thereof and a slide portion integrally formed with said outer peripheral end face.

10. The seismic isolation device as claimed in claim 4, wherein one of an outer edge portion of the friction plate and an outer edge portion of the slide portion of the friction reducing means is formed to be outwardly protruding curved face.

11. The seismic isolation device as claimed in claim 2, wherein said pressurizing means includes one selected from a group consisting of a rubber-like elastic body, a disc spring, a leaf spring, and a coil spring.

12. The seismic isolation device as claimed in claim 2, wherein said friction reducing means includes one of a slide portion baked on an outer peripheral end face of each friction plate and a slide portion integrally formed with said outer peripheral end face.

13. The seismic isolation device as claimed in claim 3, wherein said friction reducing means includes one of a slide portion baked on an outer peripheral end face of each friction plate and a slide portion integrally formed with said outer peripheral end face.

14. The seismic isolation device as claimed in claim 5, wherein a friction coefficient of the cylindrical slide part of the friction reducing means to the elastic material layer or the rigid material layer is smaller than a friction coefficient of the friction plate to the elastic material layer or the rigid material layer.

15. The seismic isolation device as claimed in claim 6, wherein said slide portion mounted to the outer peripheral end face of each friction plate is one of a resin with lubricity, a resin compound with lubricity, and a self-lubricity rubber.

16. The seismic isolation device as claimed in claim 14, wherein said cylindrical slide part is one of a resin with lubricity and flexibility, a resin compound with lubricity and flexibility, and a self-lubricity rubber.

17. The seismic isolation device as claimed in claim 14, wherein each of the friction plates laminated in the cylindrical slide part is provided with one of a slide portion baked on the outer peripheral end face thereof and a slide portion integrally formed with said outer peripheral end face.

18. The seismic isolation device as claimed in claim 8, wherein each of the friction plates laminated in the cylindrical slide part is provided with one of a slide portion baked on the outer peripheral end face thereof and a slide portion integrally formed with said outer peripheral end face.

19. The seismic isolation device as claimed in claim 6, wherein one of an outer edge portion of the friction plate and an outer edge portion of the slide portion of the friction reducing means is formed to be outwardly protruding curved face.

20. The seismic isolation device as claimed in claim 7, wherein one of an outer edge portion of the friction plate and an outer edge portion of the slide portion of the friction reducing means is formed to be outwardly protruding curved face.

* * * * *